United States Patent
Gryko et al.

(10) Patent No.: US 7,418,697 B2
(45) Date of Patent: Aug. 26, 2008

(54) METHOD AND SYSTEM FOR FAST APPLICATION DEBUGGING

(75) Inventors: Izydor Gryko, Sammamish, WA (US); Michal Sampson, Bellevue, WA (US); Brian Crawford, Seattle, WA (US); C. Douglas Hodges, Sammamish, WA (US); Michael Eng, Issaquah, WA (US); Adam Krantz, Seattle, WA (US); Eric Carter, Kirkland, WA (US); Elliot Omiya, Kirkland, WA (US); Thomas Quinn, Kirkland, WA (US); John Rivard, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 656 days.

(21) Appl. No.: 10/626,958

(22) Filed: Jul. 25, 2003

(65) Prior Publication Data

US 2005/0022167 A1    Jan. 27, 2005

(51) Int. Cl.
G06F 9/44      (2006.01)
(52) U.S. Cl. .................. 717/124; 717/124; 717/130; 717/139
(58) Field of Classification Search ........... 717/124, 717/130, 139
See application file for complete search history.

(56) References Cited

U.S. PATENT DOCUMENTS 6,202,200  B1    3/2001   House et al. ............... 717/4
6,253,368  B1    6/2001   Nelin et al. ............... 717/4
6,353,923  B1 *  3/2002   Bogle et al. ............... 717/128
6,446,135  B1    9/2002   Koppolu et al. ............ 709/313

OTHER PUBLICATIONS

"Introduction to Series 60 Applications for C++ Developers", Version 1.0, Aug. 2002 (23 pages). [Online] [Retrieved at] <ncxp.forum.nokia.com/download/?asset_id=99>.*
"Introduction to Series 60 Applications for Java Developers", Version 1.0, Aug. 2002 (14 pages). [Online] [Retrieved at] <ncsp.forum.nokia.com/download/?asset_id=98>.*
"Introduction to Borland C++ Mobile Editon 1.1", Mar. 18, 2003 (9 pages). [Online] [Retrieved at] <bdn.borland.com/article/29841>.*
Stenko, N., "Trace Techniques in Modern Debug Environments", *Electronic Engineering Designs*, 2002, 53-56.
Mandyam, S., Microsoft Redmond, WA., "3.11:Device Driver Debugging in Windows CE", *Proceedings of the Embedded Systems Conference: San Jose Convention Center*, 1999, 587-601.

* cited by examiner

*Primary Examiner*—Tuan Q. Dam
*Assistant Examiner*—Thuy Dao
(74) *Attorney, Agent, or Firm*—Woodcock Washburn LLP

(57) ABSTRACT

Specific tasks associated with debugging are performed in the background, prior to a user of an application development tool invoking the debugger. The tasks including (1) starting a hosting process, (2) loading a hosted runtime environment (e.g., .NET runtime) in the process, and (3) attaching a debugger to the hosting process, are performed in the background before the user commences debugging. Once the user invokes the debugger, the user's application is executed and debugged. Thus, the perceived time to start debugging is greatly reduced.

33 Claims, 5 Drawing Sheets

US 7,418,697 B2

METHOD AND SYSTEM FOR FAST APPLICATION DEBUGGING

FIELD OF THE INVENTION

The present invention is generally related to application debugging and more specifically related to debugging .NET applications.

BACKGROUND OF THE INVENTION

When developing software, it is not uncommon for the developer, or programmer, to want to know if the software will perform as expected. More often than not, the developer wants to know if the software has any errors at various stages in the development of the software, rather than wait until the development is complete. Determining if the software contains any errors, or bugs, is referred to as debugging. Typical software development tools, such as rapid application development (RAD) tools, include the ability to debug the software under development. For example, utilizing Microsoft's VISUAL STUDIO .NET or Visual Basic .NET development tool, an application under development can be debugged by simply depressing the F5 key. Typical RAD programmers use the debugging functionality often. Many developers tend to follow the philosophy of "try it out until it works." That is, they write a section of code and invoke the debugger. If no bugs are found, they write the next section of code. If bugs are found, they fix the code and run the debugger again. Given the frequency with which typical developers start the debugger, it is clear that a quick experience starting the debugger is very important to a developer. Also, fast debugging allows the developer to develop an application quickly, thus reducing development costs.

However, many existing software development tools take a relatively long time to get the debugger up and running after the developer commences debugging. Typically, the developer is presented with a rather long delay between invoking the "Debug" command and the time her application starts executing. In many cases, this long delay is due to the necessity to initialize the runtime environment and start the debugger.

It is clear therefore, that a desire exists for the ability to quickly debug an application after the developer starts the debugging process.

SUMMARY OF THE INVENTION

A technique for fast .NET application debugging in accordance with the present invention provides a user of an application development tool the ability to quickly debug an application. To achieve fast debugging, specific functions related to debugging are performed in advance of the user invoking the debugger. Prior to launching the debugger: a hosting process, which creates an environment in which the application can be debugged, is started; a .NET runtime environment is loaded in the hosting process; an application domain is created; and the debugger is attached to the hosting process. Thus, from the user's perspective the time to start debugging is greatly reduced because many of the functions associated with starting the debugger have already been completed when the user invokes the debugger. An exemplary method for debugging an application operating within a hosted runtime environment in accordance with the present invention includes creating a hosting process not based on the application. The hosted runtime environment is created and loaded in a separate process ("hosting process"). The debugger is attached to the hosting process. Then, when a request to debug the application is received, the application is loaded into the hosting process, in response to receiving the request.

BRIEF DESCRIPTION OF THE DRAWINGS

The features and advantages of the present invention will be best understood when considering the following description in conjunction with the accompanying drawings, of which.

DETAILED DESCRIPTION OF ILLUSTRATIVE EMBODIMENTS

Overview of a Suitable Computing System Environment

Figure 1:
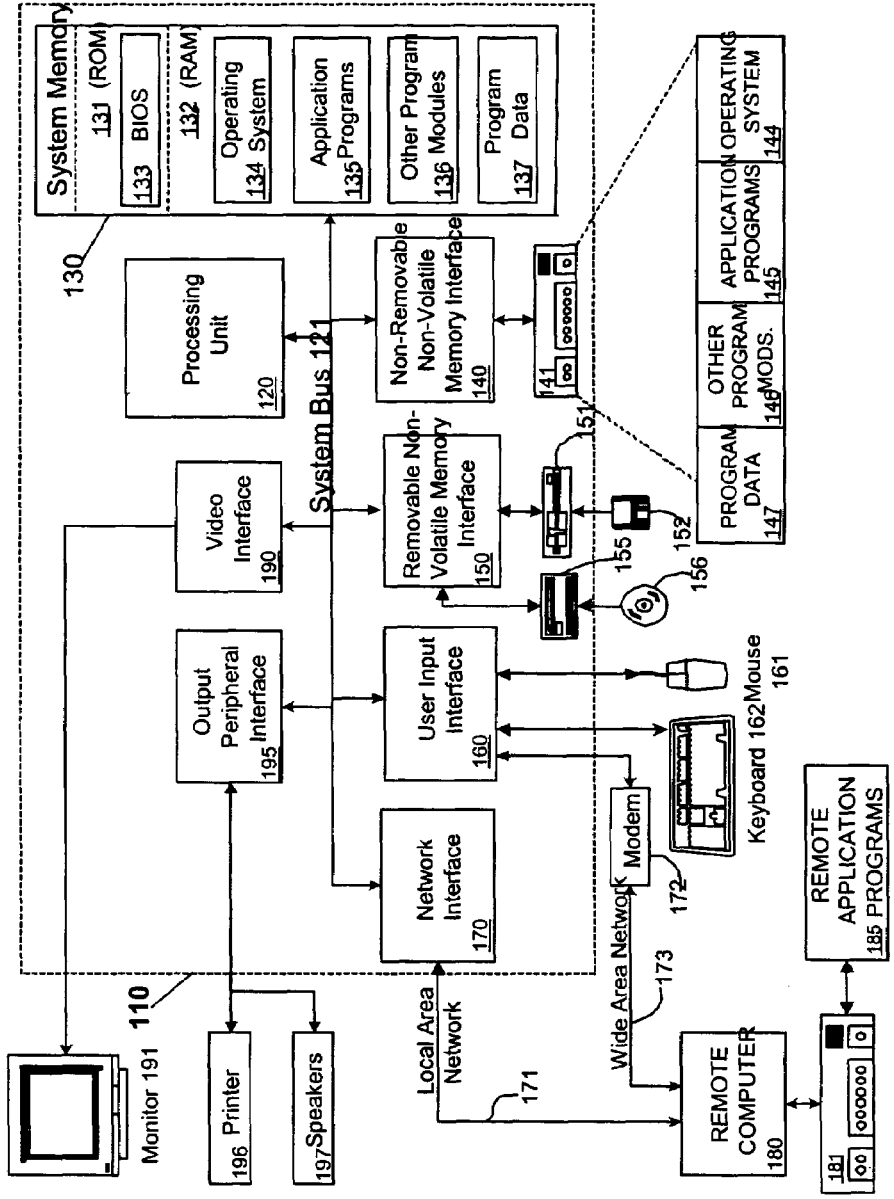
FIG. 1 illustrates an example of a suitable computing system environment in which the method and system for fast .NET debugging in accordance with an exemplary embodiment of the present invention can be implemented.

FIG. 1 illustrates an example of a suitable computing system environment 100 in which the method and system for fast .NET application debugging can be implemented. The computing system environment 100 is only one example of a suitable computing environment and is not intended to suggest any limitation as to the scope of use or functionality of the method and system for fast .NET application debugging. Neither should the computing environment 100 be interpreted as having any dependency or requirement relating to any one or combination of components illustrated in the exemplary operating environment 100.

The method and system for fast .NET application debugging are operational with numerous other general purpose or special purpose computing system environments or configurations. Examples of well known computing systems, environments, and/or configurations that may be suitable for use with the method and system for fast .NET application debugging include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The method and system for fast .NET application debugging may be described in the general context of computer-executable instructions, such as program modules, being executed by a computer. Generally, program modules include routines, programs, objects, components, data structures, etc. that perform particular tasks or implement particular abstract data types. The method and system for fast .NET application debugging may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the method and system for fast .NET application debugging includes a general purpose computing device in the form of a computer 110. Components of the computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. It is to be understood that combinations of any of the media are also included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, are typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include-other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM, CDRW, or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the .NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the method and system for fast .NET application debugging may also be implemented via an operating system, application program interface (API), or a "middleware" object between a coprocessor and requesting object, such that services may be performed by, supported in, or accessed via all of .NET's languages and services, and in other distributed computing frameworks as well.

Fast .Net Application Debugging

A system and method for fast .NET application debugging in accordance with the present invention provides the ability to quickly debug an application utilizing a .NET compatible Rapid Application Development (RAD) software development tool, such as VISUAL STUDIO .NET 7.0 and 7.1 for example. To achieve fast debugging, prior to a user commencing the debugging process: a host process is started, the .NET runtime is loaded in the host process, and the debugger is attached to the host process. In an exemplary embodiment of the invention, explained in more detail below, additional assemblies used by the user's program are also loaded in the host process prior to a user commencing the debugging process. Thus, the perceived time to start debugging is greatly reduced, because a majority of the time consuming functions are performed prior to the user's commencement of the debugging process.

Figure 2:
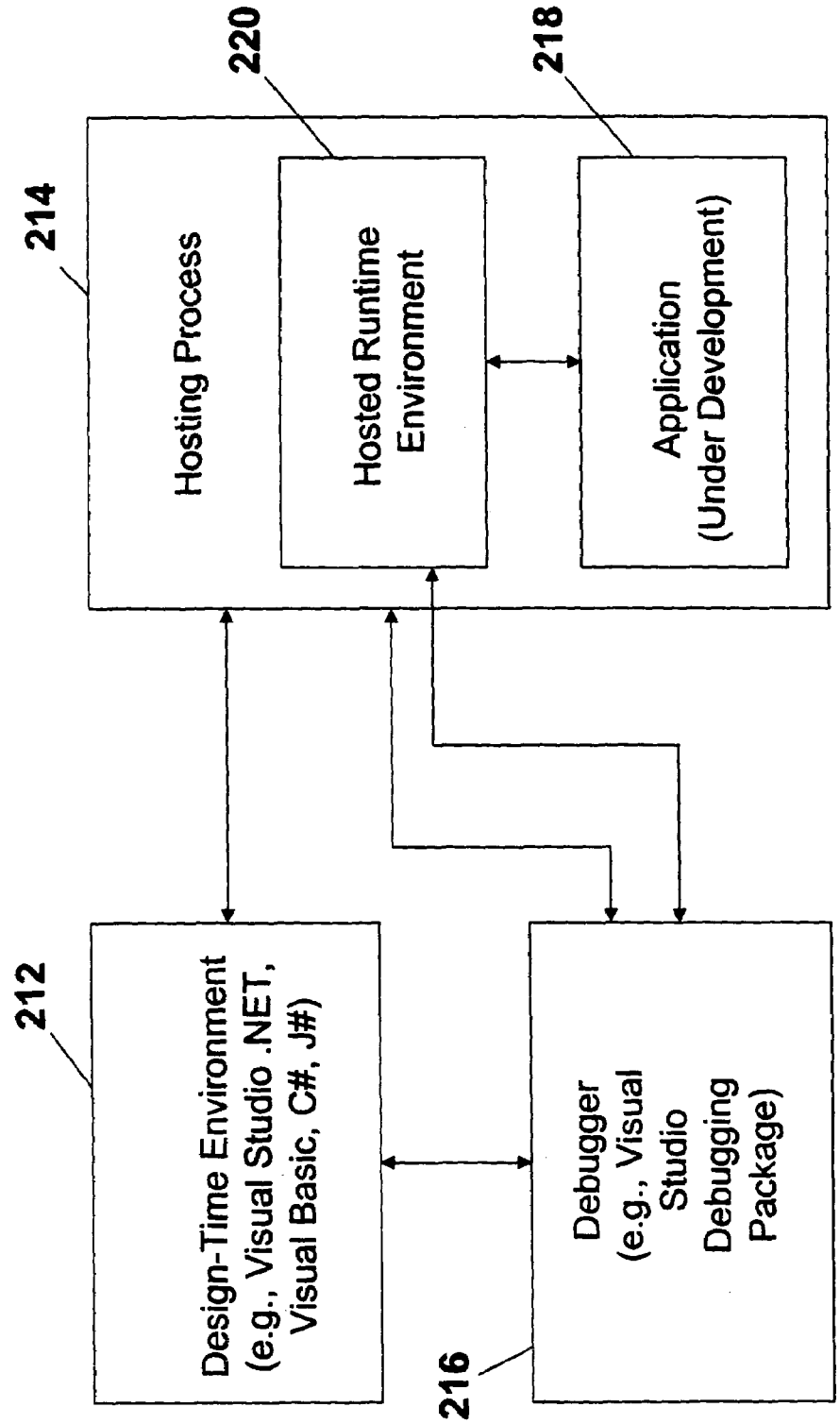
FIG. 2 is a block diagram of a system illustrating the relationships between a design-time environment in which a user develops an application, a hosting process, a debugger, and an application, in accordance with an exemplary embodiment of the present invention.

FIG. 2 is a block diagram of a system illustrating the relationships between a design time environment 212, a debugger 216 operating within that design time environment, 212, a hosting process 214, a runtime environment 220, and the user's application 218, in accordance with an embodiment of the present invention. The design-time environment 212 is responsible for instructing the operating system to create the hosting process 214. The design-time environment 212 is also responsible for instructing the debugger 216 to attach to the hosting process and to commence debugging. Furthermore, the design-time environment 212 issues instructions to the hosting process 214 to load the hosted runtime environment 220 and to begin executing the application 218.

In this exemplary embodiment, the design-time environment 212 is an environment in which a user develops an application. An example of such a design-time environment includes a rapid application development (RAD) tool. RAD tools are known in the art. An example of a RAD tool is Microsoft's VISUAL STUDIO .NET 2003. VISUAL STUDIO .NET 2003 facilitates the development of software applications in languages such as VISUAL C# .NET, VISUAL J# .NET, and VISUAL BASIC .NET.

Typically, during the development of an application, such as application 218, a user/developer wants to debug the application to determine if the application will perform as expected. To facilitate this, the design-time environment 212 provides debugging components 216. The debugger 216 is a debugging component hosted within the design-time environment 212 that is capable of debugging an application produced by the design-time environment. The debugging component 216 performs debugging operations on application 218 by communicating with the hosting process 214 and the hosted runtime environment 220. An example of an applicable debugger is the debugging package included in Microsoft's VISUAL STUDIO .NET 2003. However, it is conceivable that the invention can be practiced within any suitable design-time environment 212 and debugger 216.

The hosting process 214 creates and loads a hosted runtime environment 220; that runtime environment is responsible for executing the user's application 218. In this exemplary embodiment of the invention, the runtime environment 220 represents the .NET runtime environment.

Figure 3:
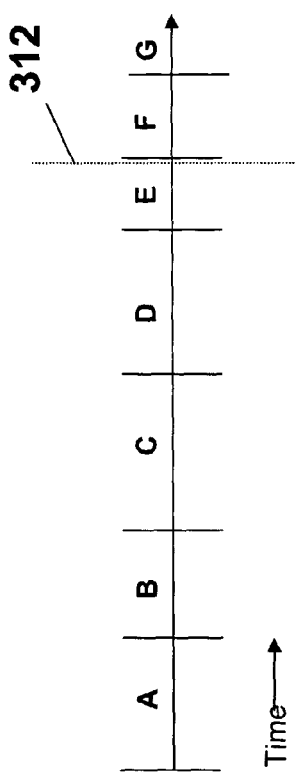
FIG. 3 is an illustration depicting exemplary timing and sequencing of events associated with debugging an application in accordance with an exemplary embodiment of the present invention.

FIG. 3 is an illustration depicting exemplary timing and sequencing of events associated with debugging an application in accordance with the present invention. Generally, to debug a .NET application, the following events occur: (1) starting the process to be debugged, (2) loading the .NET runtime in the process, (3) attaching the debugger, and (4) executing the user's code. However, in accordance with an embodiment of the present invention as illustrated in FIG. 3, the hosting process is started (event A), the .NET runtime is loaded (event B), the application domain is created (event C), selected assemblies are preloaded (event D), the debugger is attached to the hosting process (event E), the application is loaded into the hosting process (event F), and the user's code is run (event G). Time event 312 indicates the commencement of the debugging process by the user. For example, utilizing VISUAL STUDIO .NET 2003, the user depresses the F5 key to commence debugging. In this example, time event 312 would depict the depression of the F5 key. To facilitate fast .NET application debugging, events A, B, C, D and the majority of event E are performed before time event 312. That is, the hosting process is created, the .NET runtime is loaded, the application domain is created, selected referenced assemblies are preloaded, and portions of the debugger that can be attached prior to loading the application, are attached prior to the commencement of the debugging processes by the user. In another exemplary embodiment of the invention, all of event E is performed before time event 312. Although events are depicted in FIG. 3 as occurring separately and incrementally, it is to be understood that the events may occur with some degree of concurrency and in varying sequences. For example, portions of the debugger can be attached (event E) prior to the completion of the creation of the application domain (event C).

As described above, specific events occur in the background (from the user's perspective) to prepare an environment (debugging environment) in which the application can be debugged. Thus, the perceived time to start debugging is greatly reduced, compared to performing the same events after the user commences debugging. The debugging environment is created by the hosting process. Preparing the debugging environment includes loading the .NET runtime, creating an application domain in which the user's .NET application will execute, and pre-loading referenced assemblies into the created application domain. To accommodate this debugging environment, the debugger comprises a hosting process mode. In the debugger hosting process mode, the debugger starts the hosting process and manages the hosting process prior to commencement of debugging by the user, and during debugging of the application. In an exemplary embodiment of the invention, the hosting process is actually started by the design-time environment 212. The design-time environment then tells the debugger to enter a "hosting process" mode. As part of the call to enter the "hosting process" mode, the debugger is given the process D of the hosting process. Thus, the debugger knows which process it needs to attach to. Managing the hosting process includes catching exceptions in the application being debugged, stopping and/or restarting the hosting process as required, and providing information related to selected events. When the user commences debugging, the application development environment: ensures that the hosting process is started and ready for commencement of debugging, instructs the hosting process to load the user's built assembly and execute it, and instructs the debugger to begin debugging the hosting process.

In accordance with an embodiment of the present invention, some assembly routines (also referred to as assemblies) are loaded prior to the user commencing the debugging process. Only selected asemblies are preloaded. Preloading assemblies potentially shortens the time it takes to commence event G of FIG. 3. However, not all references need be preloaded. In one embodiment, only selected referenced assemblies are pre-loaded. If a referenced assembly is an assembly that can be rebuilt by the user, it is not pre-loaded. Otherwise, if a referenced assembly is not to be rebuilt by the user, it is pre-loaded. In an exemplary embodiment of the invention, an assembly is pre-loaded only if it is found in the .NET runtime Global Assembly Cache.

Figure 4:
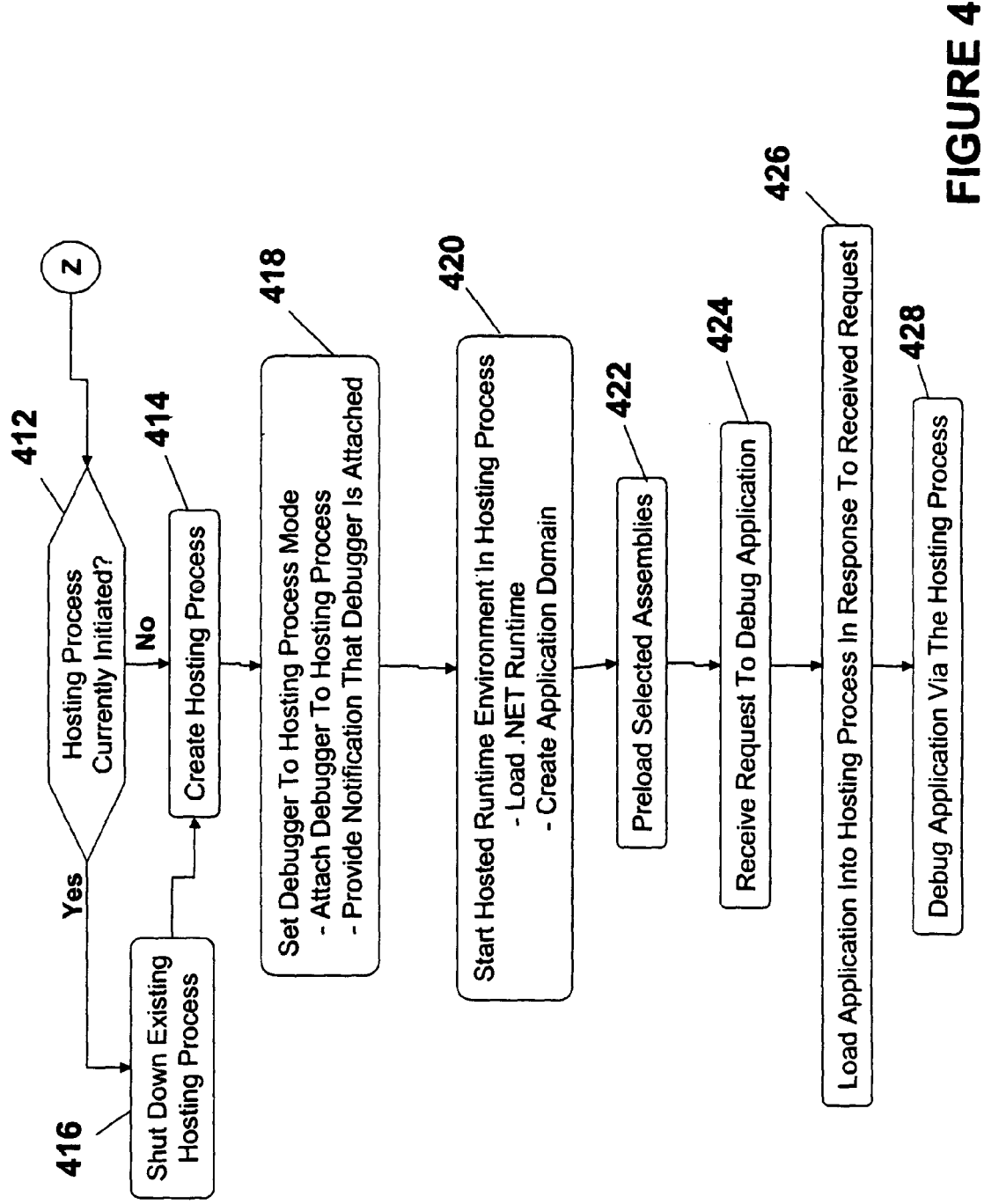
FIG. 4 is a flow diagram of an exemplary process for debugging an application in accordance with an embodiment of the present invention.

FIG. 4 is a flow diagram of an exemplary process for debugging an application in accordance with the present invention. To create a debugging environment, it is first determined if a hosting processing has already been initialized at step 412. This step is optional. Multiple hosting processes can be created. However, for ease of discussion, the flow diagram of FIG. 4 is described assuming that a single hosting process is to be created. It is also assumed that a hosting process existing prior to this creation is not the proper hosting process. Accordingly, if a hosting process has not already been initialized, then a hosting process is created at step 414. If a hosting process has already been initialized, then that hosting process is shut down at step 416, prior to creating the new hosting process at step 414. Next the debugger is set to the hosting process mode at step 418. Setting the debugger to the hosting process mode comprises creating a hosting process executable, attaching the debugger to the hosting process, and providing notification that the debugger has been attached to the hosting process.

The hosted runtime environment is started in the hosting process at step 420. Starting the hosted runtime environment comprises loading the .NET runtime and creating the application domain. In accordance with an embodiment of the present invention, starting the hosted runtime environment comprises loading the .NET runtime and creating an application domain. However, it is to be understood that the hosted runtime environment can be a script interpreter, an intermediate language interpreter, or a combination thereof. The user's application executes within the application domain during the debugging process. References are preloaded at step 422. A reference refers to an external assembly that is required by the user's application to run. The references associated with the selected assemblies may be stored in a specific cache, such as the global assembly cache, for example.

A request to debug an application is received at step 424. This request can be initiated by a user when an application is complete, or at intermediate stages in the development of the application. In response to the request to debug, the application is loaded into the hosting process for debugging at step 426. The application is debugged via the hosting process at step 428.

When a user commences debugging (e.g., depressing F5), but prior to actual debugging of the application, the system ensures that the appropriate events, as described above, have occurred. The system ensures that an appropriate hosting process has been created. If the hosting process has not been created, the system will attempt to create and initialize the hosting process as described above. The system also ensures that the hosting process has been set up correctly. Specifically, the system ensures that the .NET Runtime has been loaded in the hosting process, an application domain for executing the user's application has been created, and references that need to be pre-loaded have been pre-loaded. The system also ensures that the debugger has been attached to the hosting process and that the user's application assembly code is loading and executed. If these conditions are not met, an error indication is provided to the user.

Figure 5:
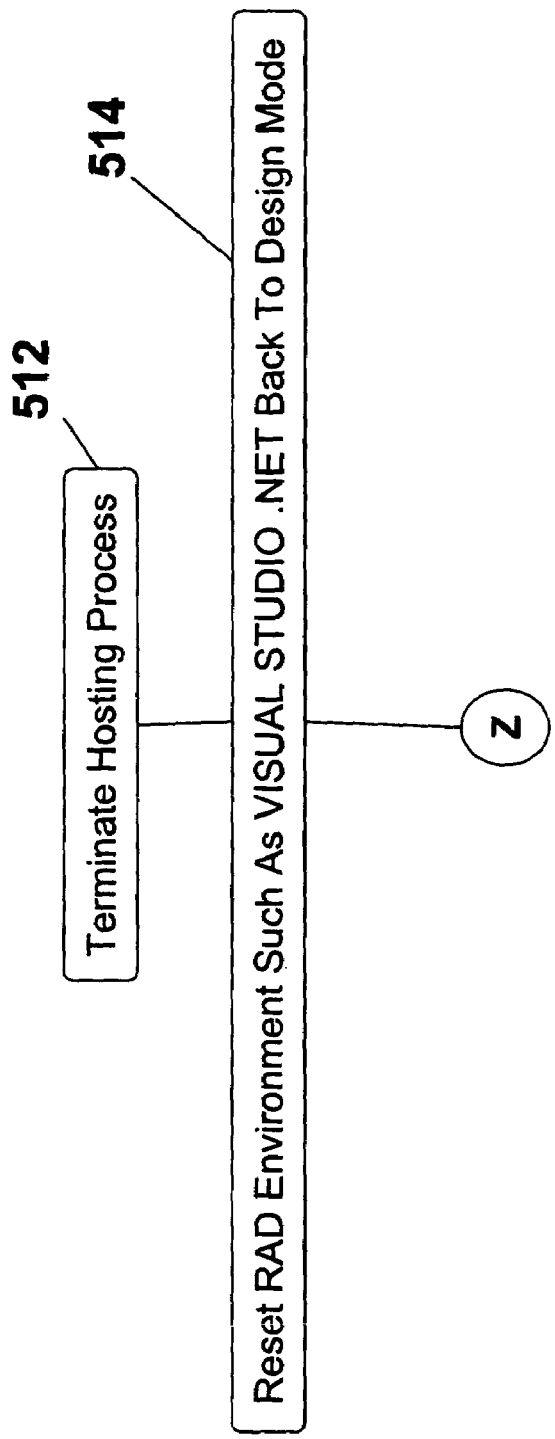
FIG. 5 is a flow diagram of a process for restarting a hosting process in accordance with an exemplary embodiment of the present invention.

FIG. 5 is a flow diagram of a process for restarting a hosting process in accordance with an exemplary embodiment of the invention. It is envisioned that a typical user debugging session will include the user writing application code, commencing debugging to determine if the application code performs as expected, finding a bug (at least the first time), correcting the bug either by stopping the debugging process or by utilizing an edit and continue feature of a RAD environment, and restarting the debugging process to determine if the corrected application code performs as expected. In one embodiment, the system will terminate the existing hosting process and start a new hosting process during the time period that the user is correcting the bug, as depicted in FIG. 5. At step 512 the hosting process is terminated. In response to the hosting process being terminated at step 512, the RAD environment (e.g., VISUAL STUDIO .NET 2003) is taken out of the debug mode and switched to a normal operating mode at step 514, such as a design mode for example. The process then proceeds to step 412 as shown in FIG. 4 as functions and previously described.

In accordance with an embodiment of the present invention, several functions are provided to facilitate fast .NET application debugging. These functions are referred to by specific names. A description of these functions is provided below. It is to be understood that the following functions and function names are exemplary, and that other appropriate functions and function names can be utilized to perform similar operations.

Functions Implemented on the Debugger

The CreateHostingProcess function sets the debugger into the hosting process mode and returns to the system an object that allows further communication between the system and the debugger. This function is asynchronous, and its completion is signaled to the caller through a callback. As part of the CreateHostingProcess function, the debugger performs internal initialization to operate in such mode. The debugger is responsible for launching the hosting process. When the launch is complete, the debugger attaches itself to the hosting process. The system will be called back when the launch and attach are complete and the hosting process is ready for further initialization. Note that no specific hosting process initialization is accomplished. This is because the system is designed to work with any hosting process. The user initializes the hosting process as desired. The design-time environment (e.g., RAD environment) system can instruct the debugger to attach to any number of hosting processes. In an alternative exemplary embodiment, the debugger does not launch the hosting process. The design-time environment is responsible for launching the hosting process and then instructing the debugger to attach it to the "hosting process" mode. The design-time environment creates the hosting process and the design-time environment calls the debugger to attach to the hosting process in "hosting process" mode.

The LaunchDebugTargets( ) function is used by the design-time environment to tell the debugger that the hosting process will enter the active (visible) debugging session. As part of the LaunchDebugTargets( ) function, the debugger is responsible for switching the mode of the .NET RAD environment (e.g., VISUAL STUDIO .NET 2003) from design to debug (if required).

Functions Implemented on the Hosting Process

The RegisterCallback function is called by the design-time environment when the hosting process is first created. The RegisterCallback function will register a callback interface to be used for communication between the system's implementation of the hosting process and the system. The Register-Callback function can be called multiple times. If the implementer already has a registered callback pointer, then the existing pointer is released. The RegisterCallback function is a synchronous function.

The UnregisterCallback function is called by the design-time environment when the system needs to break the reference to the callback without shutting down the hosting process. In the UnregisterCallback function, the hosting process is responsible for releasing the pointer given to it as part of RegisterCallback function. In one embodiment, the UnregisterCallback function is called in the Detach scenario. In the Detach scenario, a use can stop debugging the application and the application will continue running. The UnregisterCallback function is a synchronous function.

The PrepareAppDomain function is called as part of pre-debugging initialization in order to create an application domain with an appropriate configuration file. The user's application executes in the created domain. The single parameter to this function specifies the path to the configuration file. If the PrepareAppDomain function is called multiple times for a single hosting process, then only the first call will have any effect. If the system detects that a previous call to this function has been made, then such a condition is treated as neither success nor failure. The PrepareAppDomain function is an asynchronous function.

The LoadReferences function is called as part of pre-debugging initialization in order to pre-load indicated references before commencement of the debugging process. The references are loaded into the same application domain as the executing assembly. The LoadReferences function takes an array of strings as a parameter, and each string represents a reference to be loaded into the created AppDomain. Note that after the LoadReferences function completes, each successfully loaded assembly is locked on disk. The LoadReferences function is an asynchronous function.

In an exemplary embodiment of the invention, it is envisioned that a RemoveReferences( ) function is called by the system whenever a reference that matters to the hosting process (preloaded reference) is removed from the system. The RemoveReferences( ) function removes the indicated references from the AppDomain. The RemoveReferences( ) function is a synchronous function.

The EnsureHostProcReady function is called to ensure that all pending requests to PrepareAppDomain and LoadReferences are completed. This function is invoked by the system right before debugging is started. This function's implementation waits until the PrepareAppDomain request, as well as all requests to LoadReferences, are completed. The EnsuredHostProcReady function is a synchronous function.

The LoadAndRunAssembly function is called to start executing the user's application code inside the hosting process. Parameters to this function include: pszAssemblyPath, which specifies the full path of the filename that contains the user's application code to be executed; lpszCmdLineArgs, which specifies command-line arguments to be passed to the user's executable; and bDebugInZone, which specifies whether or not the user's application will run with custom security permissions. The lpszCmdLineArgs parameter is a string. The LoadAndRunAssembly function is responsible for parsing this string appropriately and for giving each argument to the runtime separately. Additional parameters include lpszAppManifestPath, lpszDeployManifestPath, lpszDebugInZoneURL. Combined, these three parameters are used to indicate which custom security zone the user's assembly will be running in. In one embodiment, if the LoadAndRunAssembly function is called while there are any pending requests from PrepareAppDomain or LoadReferences, an appropriate error value is returned. The LoadAndRunAssembly function is an asynchronous function.

Functions Implemented on the Design-Time Environment

The OnNormalAppTerminate function is called by the hosting process when the application terminates normally. In its implementation of the callback, the design-time environment is responsible for notifying the debugger that the hosting process is to be taken out of the active (visible) debug session.

The OnFinishedLoadingReferences( ) function is called by the hosting process when it finishes preloading all the references that were requested to be preloaded as part of the LoadReferences( ) call. There are no parameters to this callback method.

The ProcessDied function is called when the debugger detects that the hosting process has died. The function is called on the callback interface after the hosting process has already shut down. In one embodiment, no communication with the hosting process can take place during or after this function call. The dwReason parameter indicates the reason that the process died. Values of the dwReason parameter include: HPDR_NORMAL indicating that the process terminated normally, HPDR_EXCEPTION indicating that the process threw an exception, and HPDR_UNKNOWN indicating that the process died for an unknown reason.

The OnBeforeTerm function is called immediately before the debugger shuts down the given instance of the hosting process. This function gives the design-time environment a chance to call any cleanup methods/functions on the hosting process before that process is forcefully terminated by the debugger. In one embodiment, the system cannot interrupt the shutdown sequence at this point, and the debugger is free to ignore the return value from OnBeforeTerm. The system expects a call to ProcessDied after it returns from the OnBeforeTerm method. The parameter dwReason indicates the reason that the hosting process is being shut down. Values of the dwReason parameter include: HPTR_USER_DETACH indicating that the user has performed a Detach operation, HPTR_USER_TERMINATE indicating that the user has performed a Stop Debugging operation, and HPTR_CALLER_REQUEST indicating that the system has requested that the debugger terminate the hosting process. Note the if the user performs a "Detach" operation, the process is not literally terminated; rather the debugger is detached from the hosting process and the user's application continues to run as if no debugger were attached in the first place. However, if the user performs a "Terminate" (stop debugging) operation, the hosting process is terminated by the debugger.

A method for debugging an application as described herein may be embodied in the form of computer-implemented processes and system for practicing those processes. A method for debugging an application as described herein may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by a computer, the computer becomes a system for practicing the invention. The method for debugging an application as described herein may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes a system for practicing the invention. When implemented on a general-purpose processor, the computer program code segments configure the processor to create specific logic circuits.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While embodiments of the present invention has been described in connection with the exemplary embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

What is claimed:

1. A method for debugging an application operating within a runtime environment and loaded into an application process, said method comprising:

creating a hosting process separate from the application process and not based on said application to be debugged by a debugger, wherein said hosting process is created prior to invoking the debugger;

starting said runtime environment in the hosting process prior to invoking the debugger;

attaching a debugger to said hosting process prior to invoking the debugger, and causing the attached debugger to enter into a hosting process mode where the attached debugger is to debug the application as loaded from the application process into the hosting process;

preloading, prior to invoking the debugger, selected assemblies into an application domain prior to receiving a request to debug;

receiving said request to debug the application prior to invoking the debugger; and in response to receiving said request, loading the application from the application process into the hosting process; and invoking the debugger with respect to the hosting process and not the application process.

2. A method in accordance with claim 1, wherein said runtime environment comprises a hosted runtime environment.

3. A method in accordance with claim 1, wherein said runtime environment comprises a script interpreter.

4. A method in accordance with claim 1, wherein said runtime environment comprises an intermediate language interpreter.

5. A method in accordance with claim 1, further comprising:

creating an application domain within said hosting process for debugging said application.

6. A method in accordance with claim 1, further comprising:

configuring said debugger to a hosting process mode for debugging said application via said hosting process.

7. A method in accordance with claim 1, wherein said runtime environment is hosted by said hosting process.

8. A method in accordance with claim 1, wherein said application is developed in a design-time environment.

9. A method in accordance with claim 8, wherein said design-time environment is a rapid application design environment.

10. A method in accordance with claim 1, wherein performance of said acts of creating, starting and attaching prior to said act of receiving is not perceived by a user.

11. A system encoded in a computer-readable storage medium for debugging an application operating within a runtime environment and loaded into an application process, said system comprising:
a hosting process separate from the application process for:
preparing a hosting environment in which said application is debuggable by a debugger, wherein the hosting environment is prepared prior to invoking the debugger; and
receiving, prior to invoking the debugger, a request to debug said application, wherein said hosting process is independent of said application;
the debugger for debugging said application via said hosting process; and
a design-time environment for hosting the debugger, wherein said hosting process is created, said runtime environment is started within said hosting process, and said debugger is attached to said hosting process before said request to debug said application is received by said design-time environment, the attached debugger being caused to enter into a hosting process mode where the attached debugger is to debug the application as loaded from the application process into the hosting process, and wherein in response to receiving said request, the application is loaded from the application process into the hosting process, and the debugger is invoked with respect to the hosting process and not the application process.

12. A system in accordance with claim 11, wherein an application domain is created within said hosting process for debugging said application.

13. A system in accordance with claim 12, wherein selected assemblies are preloaded into said application domain prior to receiving said request to debug.

14. A system in accordance with claim 11, wherein said runtime environment comprises a hosted runtime environment.

15. A system in accordance with claim 11, wherein said runtime environment comprises a script interpreter.

16. A system in accordance with claim 11, wherein said runtime environment comprises an intermediate language interpreter.

17. A system in accordance with claim 11, wherein said design-time environment comprises a rapid application development tool.

18. A system in accordance with claim 11, wherein said hosting process is created, said runtime environment is started within said hosting process, and said debugger is attached to said hosting process before said request to debug said application is received as background operations not perceived by a user of said system.

19. A computer readable storage medium encoded with a computer program code for directing a computer processor to debugging an application operating within a runtime environment and loaded into an application process, said program code comprising:
a create hosting process code segment for causing said computer processor to create a hosting process separate from the application process and not based on said application to be debugged by a debugger, wherein said hosting process is created prior to invoking the debugger;
a start runtime code segment for causing said computer processor to start said runtime environment in the hosting process;
an attach debugger code segment for causing said computer processor to attach a debugger to said hosting process prior to invoking the debugger, and causing the attached debugger to enter into a hosting process mode where the attached debugger is to debug the application as loaded from the application process into the hosting process;
a preload assembly code segment for causing said computer process to preload selected assemblies into an application domain prior to receiving said request to debug;
a receive code segment for causing said computer processor to receive a request to debug the application prior to invoking the debugger;
a load application code segment for causing said computer processor to, in response to receiving said request, load the application from the application process into the hosting process; and
an invoke code segment for invoking the debugger with respect to the hosting process and not the application process.

20. A computer readable storage medium in accordance with claim 19, wherein said runtime environment comprises a hosted runtime environment.

21. A computer readable storage medium in accordance with claim 19, wherein said runtime environment comprises a script interpreter.

22. A computer readable storage medium in accordance with claim 19, wherein said runtime environment comprises an intermediate language interpreter.

23. A computer readable storage medium in accordance with claim 19, said program code further comprising:
a create application domain code segment for causing said computer processor to create an application domain within said hosting process for debugging said application.

24. A computer readable storage medium in accordance with claim 19, said program code further comprising:
a configure debugger code segment for causing said computer processor to configure said debugger to a hosting process mode for debugging said application via said hosting process.

25. A computer readable storage medium in accordance with claim 19, wherein said application is developed by a design-time environment and said design-time environment comprises a rapid application development tool.

26. A computer readable storage medium in accordance with claim 19, wherein said application is developed by a design-time environment.

27. A computer readable storage medium in accordance with claim 26, wherein said design-time environment is a rapid application design environment.

28. A computer readable storage medium in accordance with claim 19, wherein performance of said acts of creating, starting and attaching prior to said act of receiving is not perceived by a user.

29. A software development system encoded in a computer readable storage medium and comprising:
a development tool that provides a user environment and interface to develop an application loaded into an application process, said user environment and interface including a user-operable control to begin debugging; and a debugging preparation module that:

creates a hosting process separate from the application process and not based on said application to be debugged by a debugger, wherein said hosting process is created prior to invoking the debugger;

starts, in the hosting process, prior to invoking the debugger, a runtime environment under which said application is runnable; and attaches a debugger to said hosting process prior to invoking the debugger, and causes the attached debugger to enter into a hosting process mode where the attached debugger is to debug the application as loaded from the application process into the hosting process;

said user-operable control causing said application to be loaded from the application process into the hosting process prior to invoking the debugger, said user-operable control thereafter invoking the debugger with respect to the hosting process and not the application process.

30. A system in accordance with claim 29, wherein said development tool comprises a rapid application development tool.

31. A system in accordance with claim 29, wherein said hosting process comprises a hosted runtime environment.

32. A system in accordance with claim 29, wherein said user environment comprises a script interpreter.

33. A system in accordance with claim 29, wherein said user environment comprises an intermediate language interpreter.

* * * * *